Aug. 27, 1963

H. WAGEMANN 3,101,895

DECIMAL POINT MECHANISM

Filed Feb. 27, 1958

6 Sheets-Sheet 1

INVENTOR.
HEINRICH WAGEMANN

BY

N. Friedman

ATTORNEY.

DECIMAL POINT MECHANISM

Filed Feb. 27, 1958 6 Sheets-Sheet 2

INVENTOR.
HEINRICH WAGEMANN
BY N. Friedman
ATTORNEY.

INVENTOR.
HEINRICH WAGEMANN
BY
N. Friedman
ATTORNEY.

INVENTOR.
HEINRICH WAGEMANN
BY N. Friedman
ATTORNEY.

INVENTOR.
HEINRICH WAGEMANN
BY N. Friedman
ATTORNEY.

Aug. 27, 1963 H. WAGEMANN 3,101,895

DECIMAL POINT MECHANISM

Filed Feb. 27, 1958 6 Sheets-Sheet 6

INVENTOR.
HEINRICH WAGEMANN

BY

N. Friedman

ATTORNEY.

3,101,895
DECIMAL POINT MECHANISM

Heinrich Wagemann, West Orange, N.J., assignor to Monroe Calculating Machine Company, Orange, N.J., a corporation of Delaware Filed Feb. 27, 1958, Ser. No. 717,864
19 Claims. (Cl. 235—63)

The present invention pertains to calculating machines and more particularly to decimal point indicating mechanism therefor.

One well-known type of calculating machine comprises a fixed frame and a denominationally shiftable carriage which carries an accumulator register, a counter register, and a series of depressible tab stop keys operable to terminate a carriage shift in any desired intermediate position. Values to be entered into the accumulator register are set up on a keyboard provided on the fixed frame. Prior art machines of this type also include decimal point indicating devices for the keyboard and the accumulator and counter registers, said indicating devices requiring manual adjustment by the operator. For both multiplication and division, the decimal point positions are manually set in accordance with the conventional rule that the number of decimal places for the accumulator register is equal to the sum of the decimal places set on the keyboard and the counter register. Thus, the operator will set a given number of places on the keyboard, a like number of places for the counter register, and twice said number of places for the accumulator.

In accordance with the present invention, the machine is provided with manually operable means for setting a decimal point position for the keyboard around which factors of a calculation may be entered. After the desired decimal point position is set, a subsequent carriage shifting operation will automatically cause one of a series of decimal point markers to be set for the accumulator register at twice the number of keyboard decimal places, and will also cause setting of that one of the tab keys which, when effective, will terminate shifting of the carriage in that denominational position where the decimal marker for the accumulator is in alignment with the decimal location set on the keyboard. Accordingly, values may be entered around the decimal point set on the keyboard and added to or subtracted from a value standing in the accumulator register.

The set tab key will also be effective to serve as a decimal indicator for the counter register.

It is therefore a major object of the invention to provide automatically operable decimal point indicating mechanism for a calculating machine.

It is an object of the invention to provide decimal point mechanism wherein the setting of a decimal position for the keyboard is effective to control the setting of a decimal point marker for the accumulator register and of tabular stop means whereby a carriage shift will be terminated when the accumulator decimal point position is aligned with the decimal point position of the keyboard.

It is a further object of the invention to provide decimal point mechanism in which the setting of decimal point position for the keyboard will control the setting of a series of tabular stop keys for the carriage, the set stop key serving as a decimal point indicator for the counter register carried by the carriage.

A feature of the invention resides in the provision of means carried by the fixed frame of the machine for controlling selective setting of tabular stop means for the carriage.

A related feature resides in the provision of two means for controlling selective setting of tabular stop devices which are carried by the carriage, one of said means being carried by the carriage and the other by the fixed framing of the machine.

A further feature of the invention resides in the provision of means for effecting joint resetting of the decimal point indicating means for the keyboard and accumulator register and of the tabular stop means.

The above and other objects, features, and advantages of the present invention will be more fully understood from the following description when considered in connection with the accompanying drawings.

GENERAL DESCRIPTION OF THE MACHINE

Figure 1:
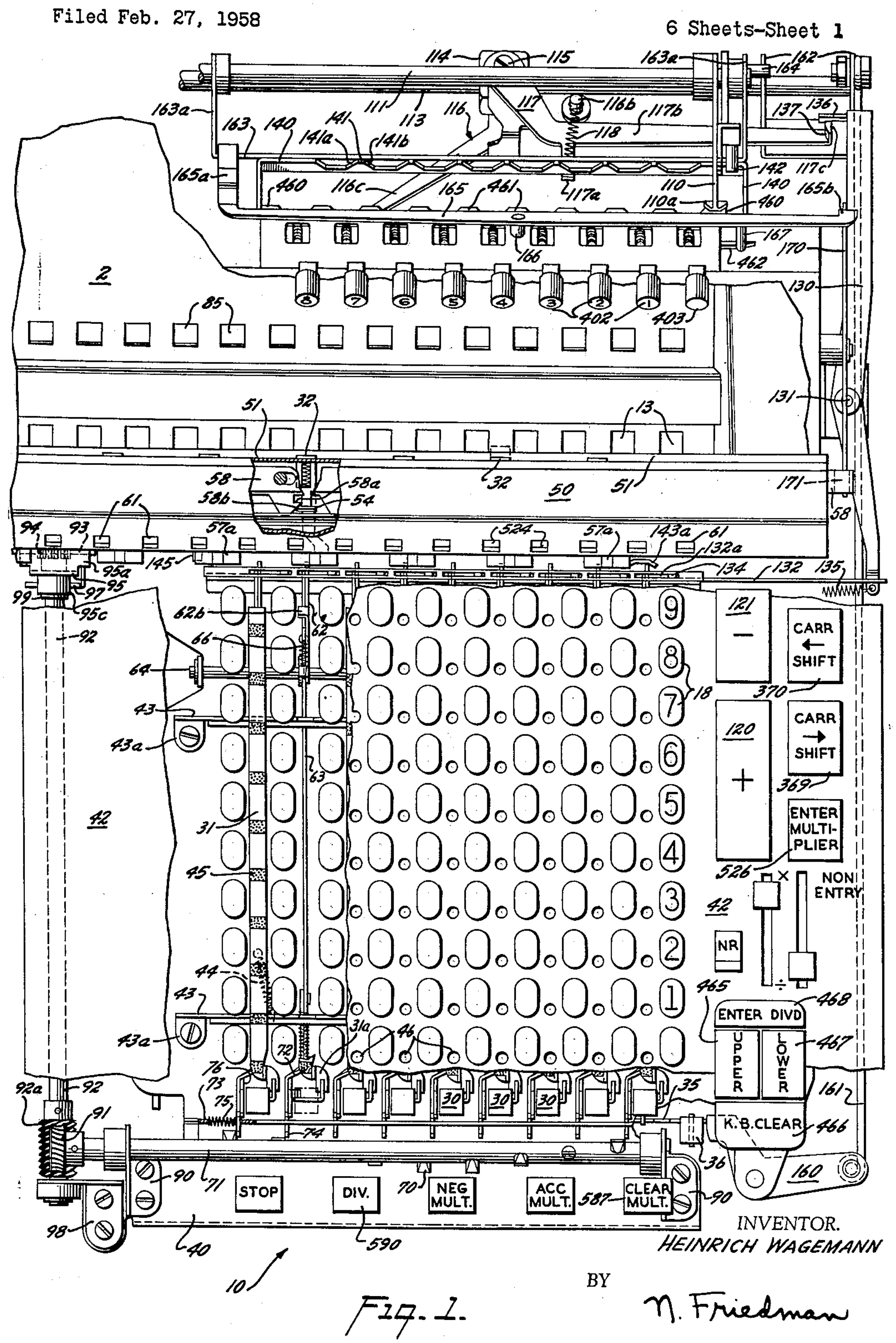
FIG. 1 is a top plan view of a calculating machine incorporating the decimal point mechanism of the invention, portions being broken away and removed.

The invention will be shown and described as embodied in a calculaing machine of the type disclosed in Patent 2,531,207, issued to Herman Gang, November 21, 1950, and other patents to be referred to subsequently. To the extent practicable, parts of the instant machine which correspond to like parts of the noted patents will be similarly numbered and reference is made to said patents for details of construction not disclosed herein. It will be understood, however, that the present disclosure is exemplary only, since the invention can be applied in other forms and to other machines.

As set forth in Patent 2,531,207, the machine includes a fixed body portion 10 (FIGS. 1, 2, 5) having a plural order digit keyboard 18 and various motor keys whose functions will be described subsequently. Mounted on the body portion 10 is a denominationally shiftable carriage 2 which carries an accumulator or product-dividend register 13, a multiplier storage register 524, and a counter or quotient register 85. Amounts set up on the differential actuator gears 5 by means of keys 18 and selector bails 19 are entered into the accumulator wheels 13 positively or negatively depending upon the direction of rotation of the digital actuator shaft 4 and the shaft 154 upon which the tens transfer actuators 17 are mounted.

In accordance with conventional terminology of the art, the leftmost denominational position of the carriage (as in FIG. 1) is designated "first" position, and the successive positions to the right are known as "second," "third," etc.

*Carriage Shifting Mechanism*

For the purpose of shifting the carriage, a spring plunger 359 (FIGS. 2, 3) depending therefrom engages an elongated worm shaft 358 journalled in the fixed framing of the machine. The carriage is thus shifted to the right or to the left upon rotation of worm 358 in one or the other direction.

Figure 3:
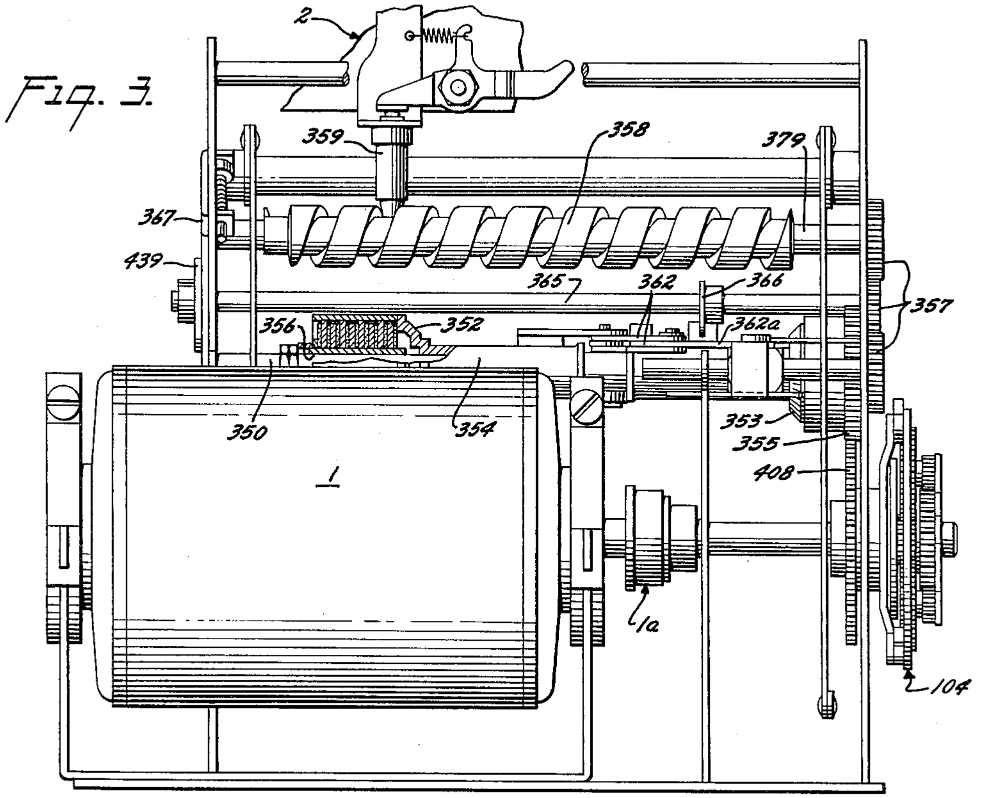
FIG. 3 is a fragmentary rear elevation showing the drive mechanism of the machine.

The power drive for operating the digital actuating and the carriage shifting mechanism includes an electric motor 1 which, through a pulley and belt coupling 1*a*, drives a reversible differential gear clutch 104 constructed in accordance with the disclosure of Chase Patent 1,566,-650, dated December 22, 1925. As best seen in FIG. 3, two friction clutches 352 and 353 are provided, the driving elements of these clutches being connected for rotation as a unit by a sleeve 354. The driving elements of clutches 352 and 353 are connected to the output gear 408 of the differential gear drive 104 by means of a gear 355 secured to the driving member of clutch 353. The driven member of clutch 352 comprises a sleeve 356 fast upon shaft 350, a series of friction disks being interposed between the driving member of the clutch and the driven member 356. Normally, clutch 352 is held engaged under spring tension, connecting the drive to the actuators 5 to the output of the differential gear clutch.

Clutch 353, which is normally disengaged, has a driven member similar to member 356 of clutch 352 except that it is freely supported on shaft 350 and is provided with a gearing drive connection 357 to shaft 379 on which the carriage shift worm 358 is mounted. Accordingly, clutch 353 when engaged will be effective to drive the worm 358 whereby plunger 359 engaged therewith will cause shifting movement of the carriage in either direction depending on the direction of rotation of the worm.

Figures 2, 9:
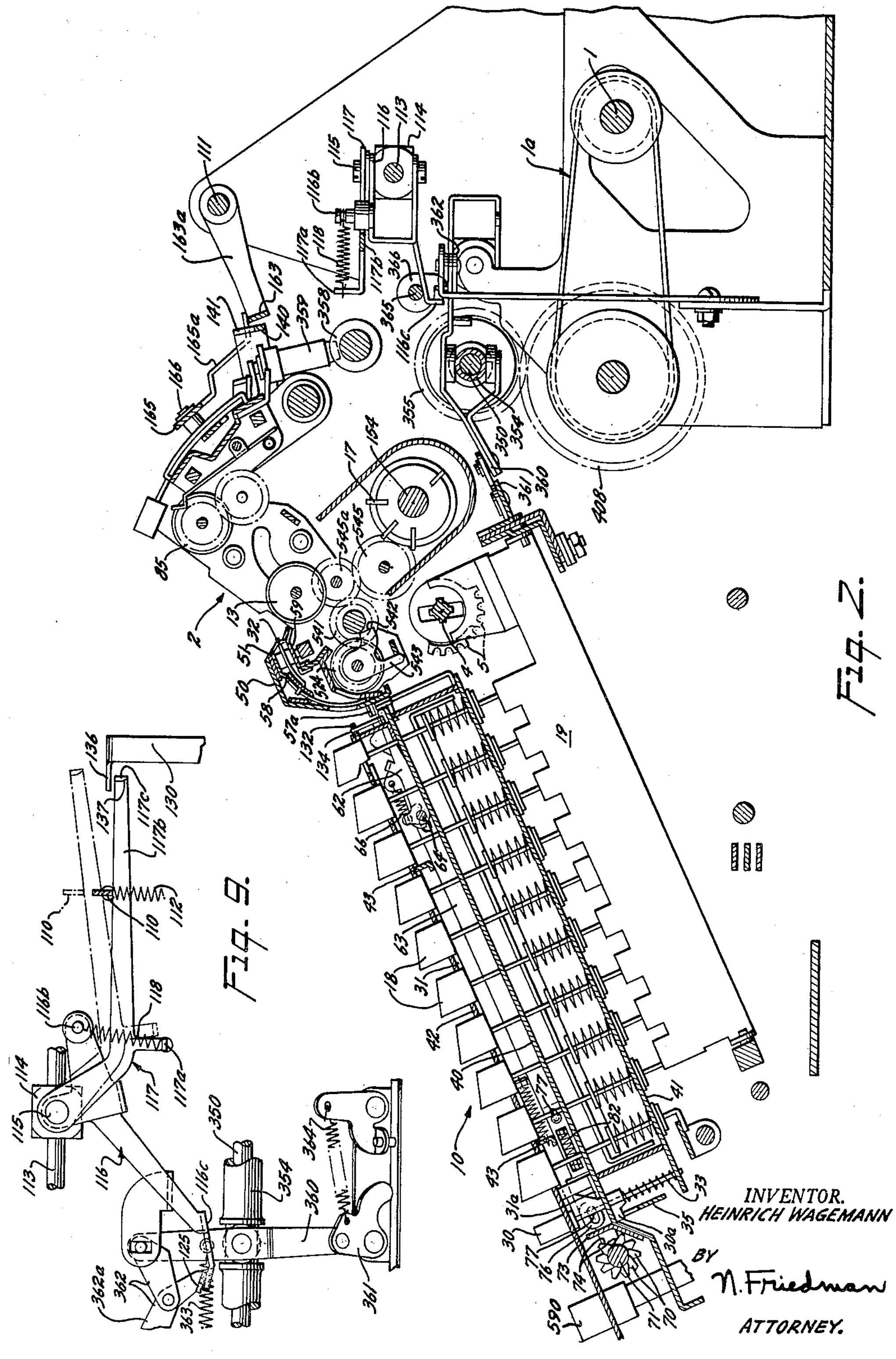
FIG. 2 is a longitudinal sectional view of the machine.
FIG. 9 is a top plan view showing the shift toggle and the mechanism for effecting automatic depression of a tab key.
Figure 10:
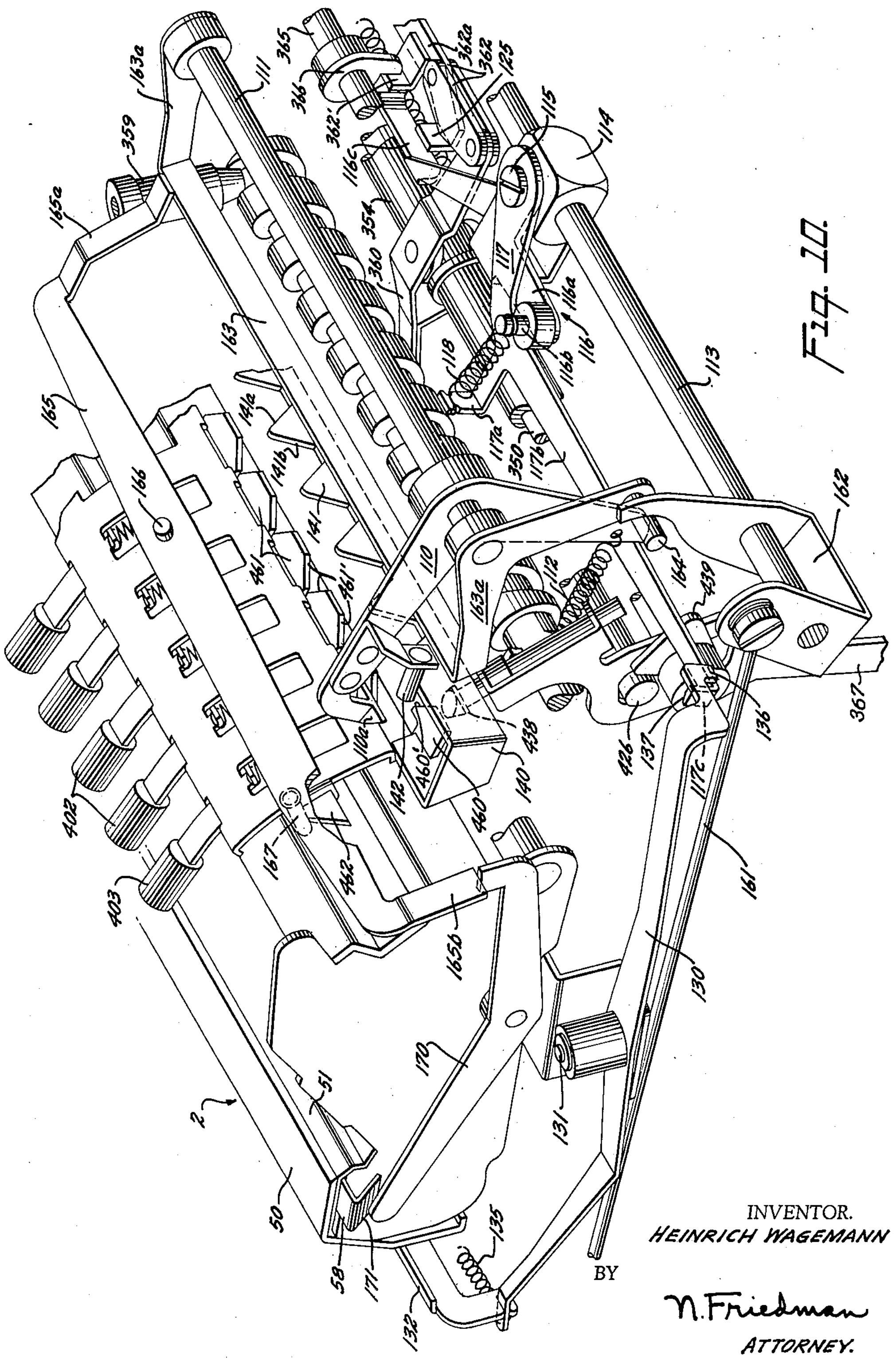
FIG. 10 is a perspective view taken from the rear of the machine, showing portions of the decimal point mechanism of the invention.

Sleeve 354 is moved to the right or to the left and is held under spring tension in either shifted position, to engage clutch 352 or clutch 353, by means of a toggle arrangement shown in FIGS. 2, 9, 10 and fully disclosed in Patents 2,531,204 and 2,419,760. A shifting arm 360 is provided with antifriction rollers engaging between flanges of sleeve 354, and is pivoted at its forward end to a link 361 having pivotal connection to the machine framing. At its other end arm 360 has pivotal connection with one link of a toggle 362, the far end of the other link 362*a* of this toggle being also pivotally secured to a bracket rigidly mounted on a fixed shaft extending between the side frames of the machine. In normal position of the parts, toggle 362 is fully extended, holding arm 360 against the tension of spring 363 in position to engage clutch 352. In this position, said clutch is yieldably held engaged under the tension of spring 364 connected to link 361. In order to disengage clutch 352 and engage clutch 353, means are provided for breaking the toggle 362, thereby allowing spring 363 to move sleeve 354 to the right as viewed in FIG. 3. In this position clutch 353 will be held engaged under the tension of spring 363, enabling the drive train to the carriage shifting worm 358. For breaking the toggle 362, a shaft 365 (FIGS. 2, 10) is adapted to be rocked clockwise and is provided with a finger 366 which will unset the toggle through contact with a lug 362' of link 362*a* thereof. Shaft 365 is rocked by depression of the right shift key 369 or left shift key 370 as follows.

*Shift Keys*

Figures 5, 6:
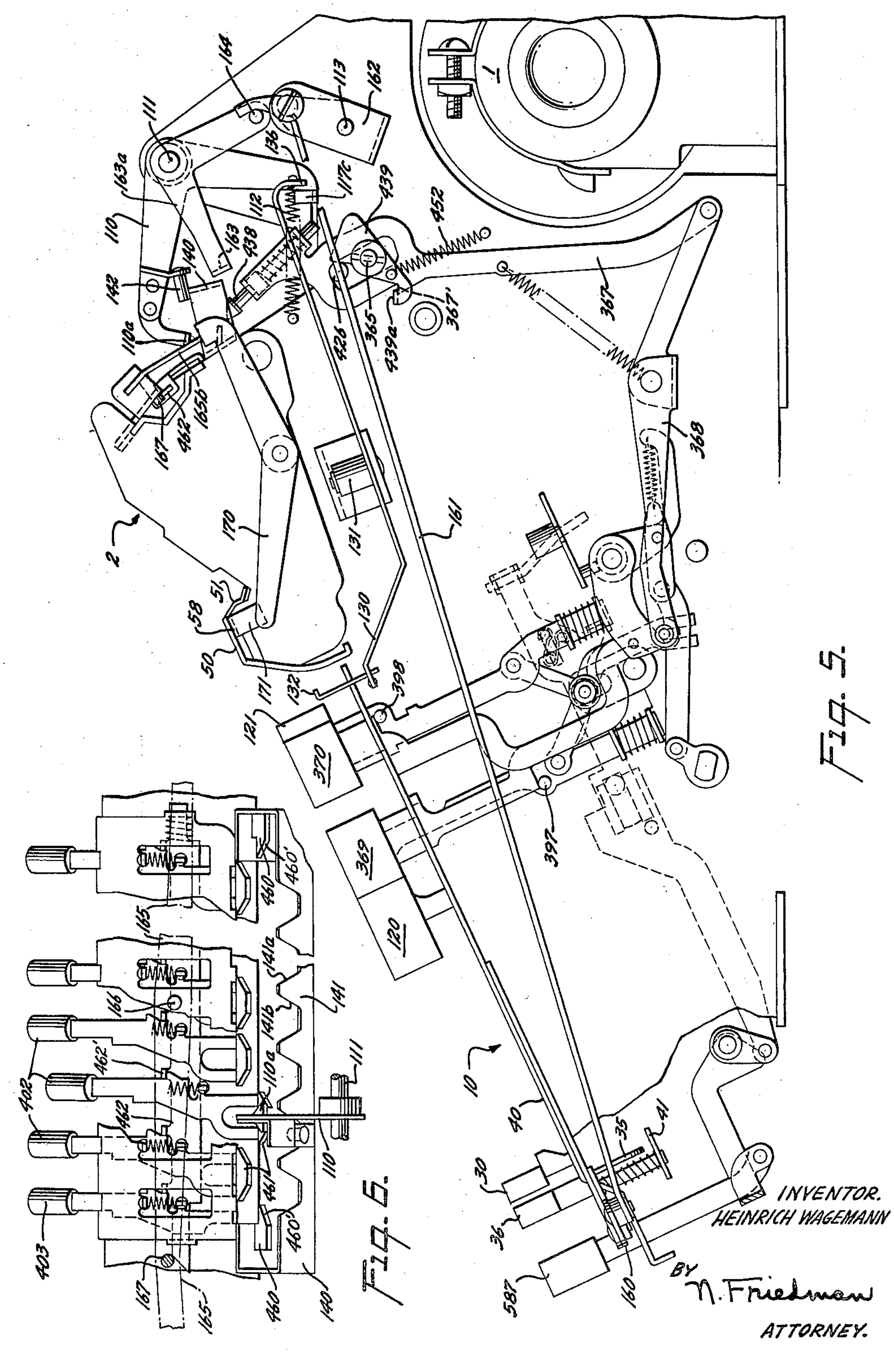
FIG. 5 is a right side elevation showing the shift control mechanism and certain features of the decimal point mechanism.
FIG. 6 is a fragmentary rear elevation showing the tab keys for terminating carriage shift in selected denominational positions.

Keys 369 and 370 are mounted in the machine frame closely adjacent to the plus bar 120 and minus bar 121 (FIG. 5). Right shift key 369 has a shoulder overlying a stud 397 carried by the stem of plus bar 120, and left shift key 370 has a shoulder overlying a stud 398 in the stem of minus bar 121. Both shift keys extend downwardly and have pin and slot connection with the forward end of a pivoted lever 368. Pivotally mounted on the rear end of lever 368 and spring biased toward the front of the machine is an arm 367 provided with a shoulder 367' and provided at its free end with an upwardly spring biased plunger 438. Fixed on the right end of shaft 365 is a latch lever 439, the forward end of which is provided with a bent over portion 439*a* normally overlying the shoulder 367' on arm 367 and the rear nose portion of which acts as a stop by contact with a shaft 426. Depression of the right shift key 369 will, therefore, effect depression of the plus bar 120, effecting additive drive from the differential 104 to the driving members of friction clutches 352 and 353 and conversely, negative drive from the differential will be effected by depression of the left shift key 370 which will cause depression of the minus bar 121. As the same time, depression of either of the shift keys will depress the forward end of lever 368 and raise its rearward end with the arm 367 attached thereto. This movement will rock latch lever 439 and shaft 365 clockwise, against the urge of spring 452 secured to the former, by contact of shoulder 367' with the bent over portion 439*a* of said lever, breaking the toggle 362 and thus disengaging clutch 352 and engaging clutch 353.

In the manner fully disclosed in column 4, lines 8 et seq. of Patent 2,531,204, the breaking of toggle 362 to initiate a shift is also effective to cause certain preliminary adjustments of the shift control mechanism followed immediately by commencement of shifting movement of the carriage. The shift will continue as long as a shift key is held depressed, or until the carriage has been shifted into a position indicated by a set tabulating key 402 or to either of its extreme positions.

Upon release of the shift key, shaft 365 will be restored by counterclockwise rotation of latch 439, under the urge of spring 452. This return movement of shaft 365 will be effective to initiate a shift terminating operation including normalizing of the shift control mechanism and resetting of toggle 362 as disclosed in columns 5 through 7 of Patent 2,531,204.

*Shift Terminating Means (Last Place Stop and Tabulating Keys)*

The shift terminating means are operable in the manner fully disclosed in Patent 2,531,204, as follows. Should the right shift key 369 or left shift key 370 be held depressed until the carriage is shifted into either of its extreme positions, shift initiating shaft 365 will be restored to normal, whereby the shift is terminated, in the same manner as when the shaft 365 is restored to normal upon release of the shift key. For this purpose, two lugs 460 (FIGS. 1, 6, 10) are located on the rear of carriage 2 and are so spaced that the nose of plunger 438 mounted on arm 367 is positioned just below one or the other of the lugs when the carriage is in either of its extreme shifted positions. Should the carriage be in the extreme left-hand position (FIG. 10), for example, and the right shift key be depressed, the plunger, which is spring urged to its normal position (FIG. 5), will be depressed by contact with the lug 460 when arm 367 is raised and the shift initiated. When the carriage has shifted from the extreme left-hand position, the lug 460 will be removed from contact with the plunger 438 and said plunger will be spring urged to its extended position. As the carriage is shifted into the extreme right-hand position, the nose of the plunger will ride outward on the inclined cam edge 460' of the lug 460, thus moving arm 367 to the rear against the tension of its spring. This movement of arm 367 will remove shoulder 367' from restraining engagement with latch lever 439, allowing the lever and rock shaft 365 to be spring urged counterclockwise to normal and thus terminate the shift. When the shift key is finally released, the plunger 438 will drop below lug 460 and arm 367 will be urged forward by its spring, locating the shoulder 367' in its normal position below the forward end of latch lever 439. Termination of the shift at the extreme position in the opposite direction is, as will be readily understood, accomplished in the same manner. Should a shift key be depressed while the carriage is in the extreme position of the indicated shift, a shift will be initiated, but as the plunger 359 is at the end of the worm 358 the drive will be ineffective to move the carriage. However, the plunger 359, which is spring urged within the groove of the worm 358, will be raised to ride over the outer diameter of the worm by the eccentric configuration of the worm at either end, as will be seen in FIGS. 3 and 10.

The tabulating keys 402, one for each order intermediate the extreme right and left-hand carriage shift positions, are located on the rear of the carriage intermediate the lugs 460 (FIGS. 1, 6, 10). As can best be seen in FIG. 1, for the purposes of the present invention the keys have been relocated rightwardly of their normal positions in alignment with the counter dials 85, to positions substantially intermediate said dials. As will be discussed hereinafter, this will enable a depressed tab key to serve as a decimal marker for the counter register. The lower end 461 of each key 402 is bent outwardly from the carriage to form a lug at substantially the same angle as the lugs 460, and is provided with a pair of oppositely inclined cam edges 461′ which are adapted to displace plunger 438 in the same manner as described in connection with the inclined cam edges 460′ of the lugs 460. In the unset position of the keys 402, the lugs 461 are disposed above and out of range of the plunger 438 when a shift key is depressed. However, when one of the keys 402 is depressed, its end lug 461 is brought into the same plane as the lugs 460. Should the carriage be shifted either to the right or left the arm 367 will be displaced pivotally against the tension of its spring by contact of the nose of the plunger 438 with one or the other of the cam edges of the lug 461 of the set tabulator key to terminate the shift in the same manner as that previously described in connection with the lugs 460 of the carriage. The set key will be effective to terminate the shift when the carriage moves into the denominational position corresponding to said key. For example, the first (right-most) key 402 will terminate the shift when the carriage moves to second position, i.e., when the carriage is one order to the right of its left end position; the second key 402 will terminate the shift in third position, etc. It will be noted that upon termination of the carriage shift said arm 367 will be held in rearwardly displaced position by contact of the nose of plunger 438 with the lug 461 of the set key. However, upon release of the shift key said arm 367 will be restored by its spring, shoulder 367′ of said arm will be located below the forward end of latch lever 439 and said plunger 438 will be located below the lug 461 of the set key. The plunger 438 being thus restored to normal lowered position and the carriage being still located in the order indicated by the set tabulator key, upon depression of either shift key and consequent raising of said arm 367, the plunger 438 will be depressed against the tension of its spring by contact with the overlying lug 461 of the set key so that there will be no interference with the raising of the arm 367 in initiating the shift. The carriage being thus shifted into a new order, the lug 461 of the set key will no longer overlie said plunger 438, which latter will be restored to normal extended position by its spring and thus conditioned to contact one or the other of the end lugs 460 of the carriage to terminate the shift in either extreme position thereof. As will be noted in FIG. 6, a depressed key 402 is latched in set position by a lug 462′, one of which is provided for each key on slide 462 which is spring urged toward the right side of the machine. Upon depression of any one of the tabulator keys 402 and before it is latched, an inclined edge of the key stem will, by contact with its lug, cam the locking slide 462 to the left, allowing the previously set key to be restored by a suitable spring to normal. An additional resetting key 403 is provided which does not include a lug 461 but which functions in like manner to unset any one of the tabulator keys 402, thereby providing for extreme shift in either direction.

It will be noted from an inspection of FIG. 5 that the operating connection between latch lever 439 and arm 367 permits movement of lever 439 and the parts connected therewith to shift initiating position independently and without displacement of arm 367. As fully disclosed in Patent 2,531,207, such independent movement is effected in shift initiating operations incident to programs of multiplication and division. It will be apparent, therefore, that any set tabulator key 402 will be effective to interrupt only those shifting operations initiated by depression of the shift keys, which operate to move plunger 438 of arm 367 into the path of the lug 461 of the set tabulator key.

*Multiplication*

To perform multiplication the multiplier is set on the keyboard 18 and is then entered into the multiplier storage dials 524 in response to depression of key 526. Details of the mechanism whereby the multiplication program is controlled are set forth in Patent 2,531,206 dated November 21, 1950 as modified by the Gang Patent 2,572,920 of October 30, 1951 and the Pinckney Patent 2,603,417 of July 15, 1952. In the manner disclosed in said Gang patent, operation of key 526 initiates a preliminary shift of the carriage to left-most position for entry of the multiplier, if the carriage is not already in that position. Thereafter the multiplier is automatically entered into dials 524 in accordance with the disclosure of Patent 2,531,206.

As set forth in the Pinckney patent the tabulating stop means are disabled during the above noted left shift, so that any depressed tab key 402 will be ineffective to improperly terminate the shift in an intermediate position of the carriage.

The multiplicand is then set up on the keyboard, and key 587 operated to initiate the multiplication program. The control mechanism for this program is operable in the manner described at length in Patent 2,531,207 and briefly discussed below. The calculation is intiated with the carriage in leftmost position, each successive higher order multiplier storage dial 524, starting with the lowest, being cyclically counted back to zero by a counting finger (not shown) to control the number of registration cycles. When a multiplier digit has been counted out of a given order, the carriage is shifted to the right to place a higher order of the multiplier storage mechanism in position for cooperation with the counting finger. Associated with each multiplier storage dial (FIGS. 2, 4) is a hub 541 having a V-shaped notch 542 and a sensing finger 543 which rides on said hub and is adapted to enter the notch when the dial stands at zero.

Figure 4:
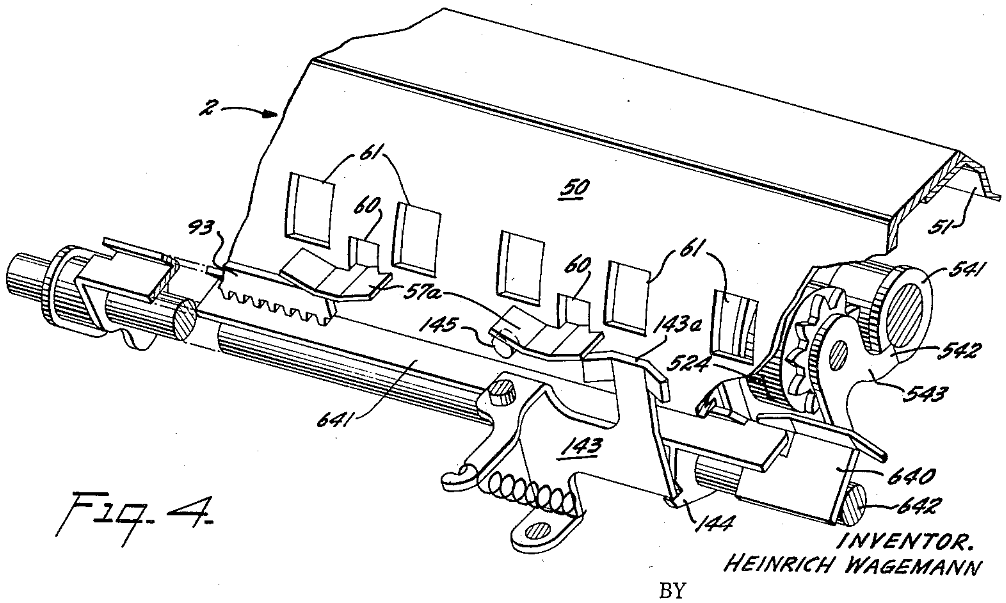
FIG. 4 is a fragmentary perspective view showing the carriage and associated multiplication control mechanism carried by the fixed framing.

The actuation, carriage shift, and stopping of the machine are controlled by bails 640 and 641 (FIG. 4). The bails are mounted on a shaft 642 extending between the side frames of the machine, and are located just below the forward edge of carriage 2. Bail 640 is secured on shaft 642 and bail 641 is pivotally mounted thereon. Bail 640 is operated in connection with the finger 543 of the storage dial 524 which is in alignment with the units order of the keyboard and thus is in position to be counted out by the afore-mentioned counting finger. It will be noted that when the related storage dial is not in zero registering position, bail 640 is held in counterclockwise position by finger 543; however, when the dial is counted back to zero the V-shaped notch of the hub will be in registration with finger 543 and will therefore allow counterclockwise movement of said finger and clockwise movement of bail 640. Such movement of bail 640 is effective to initiate a carriage shift which will continue to the right until a finger 543 of a storage dial 524 containing a significant value therein is brought into contact with bail 640, rocking said bail counterclockwise to terminate the shift. The shift initiating mechanism controlled by bail 640 is operable independently of the previously described arm 367 and accordingly any set tabulator key 402 will be ineffective to terminate the shift.

In the prior art machine of Patent 2,531,207, bail 641—which is effective to terminate the calculation when allowed to rock clockwise to the rear—is held in counterclockwise position only if there is a significant digit either in the storage dial being counted back to zero or in any higher order dial. In the former case bail 641 is held out by bail 640, while in the latter case it is held out by abutting the sensing finger 543 of the higher order dials. Thus as soon as the last significant digit of the multiplier is counted back to zero, bail 641 will be allowed to operate to terminate the calculation.

However, in the machine of the present invention bail 641 is maintained in counterclockwise position until the carriage shifts into its right end position, and only then is the bail allowed clockwise movement for the purpose of terminating the calculation. Thus in a multiplication operation the carriage will always shift to rightmost position regardless of the ordinal location of the highest multiplier digit. The reasons for and means by which this is effected will be discussed subsequently.

After the carriage is shifted to rightmost position upon completion of the calculation, the multiplication program then concludes with a conventional carriage return to the left initiated by automatic depression of the left shift key 370; accordingly a depressed tab key 402 will now be effective to terminate the shift in an intermediate carriage position.

*Division*

Division is performed as follows. The dividend is set up on keys 18, and is then entered into the accumulator register 13 in response to depression of key 468. The dividend entering mechanism is operable in the manner disclosed in Patent 2,531,206, as modified by the Gang Patents 2,721,698 of October 25, 1955 and 2,636,677 of April 28, 1953, and initiates a preliminary rightward shift of the carriage which will be terminated in right end position if no tab key 402 is depressed, or in an intermediate position corresponding to a set tab key. As disclosed in Patent 2,721,698, if the carriage is already in the position corresponding to the set tab key, the shift initiating means will be disabled and the dividend set-up operation will be initiated with the carriage standing in its original position.

The divisor is set on keys 18, and divide key 590 depressed to initiate the calculation which is controlled by the mechanism disclosed in Patent 2,531,207. Each quotient digit is calculated by the well-known subtract-add-shift method in which (1) the divisor is subtracted from the dividend until an overdraft occurs; (2) the divisor is added back to the dividend in a single corrective cycle; (3) finally followed by a single order carriage shift to the left and a subsequent repetition of the sequence of operations. The successive leftward shifts are initiated independently of shift key 370, and accordingly will not be terminated by a depressed tab key 402. Each quotient digit is counted into the dial 85 of the counter register which is then aligned with the units order of the keyboard.

In accordance with the disclosure of Patent 2,636,677, depression of the divide key 590 when the carriage is out of rightmost position, as for example in a position corresponding to a depressed tab key, will cause the calculation to be preceded by an automatically initiated shift to right end position.

DECIMAL POINT MECHANISM

Figures 7, 8:
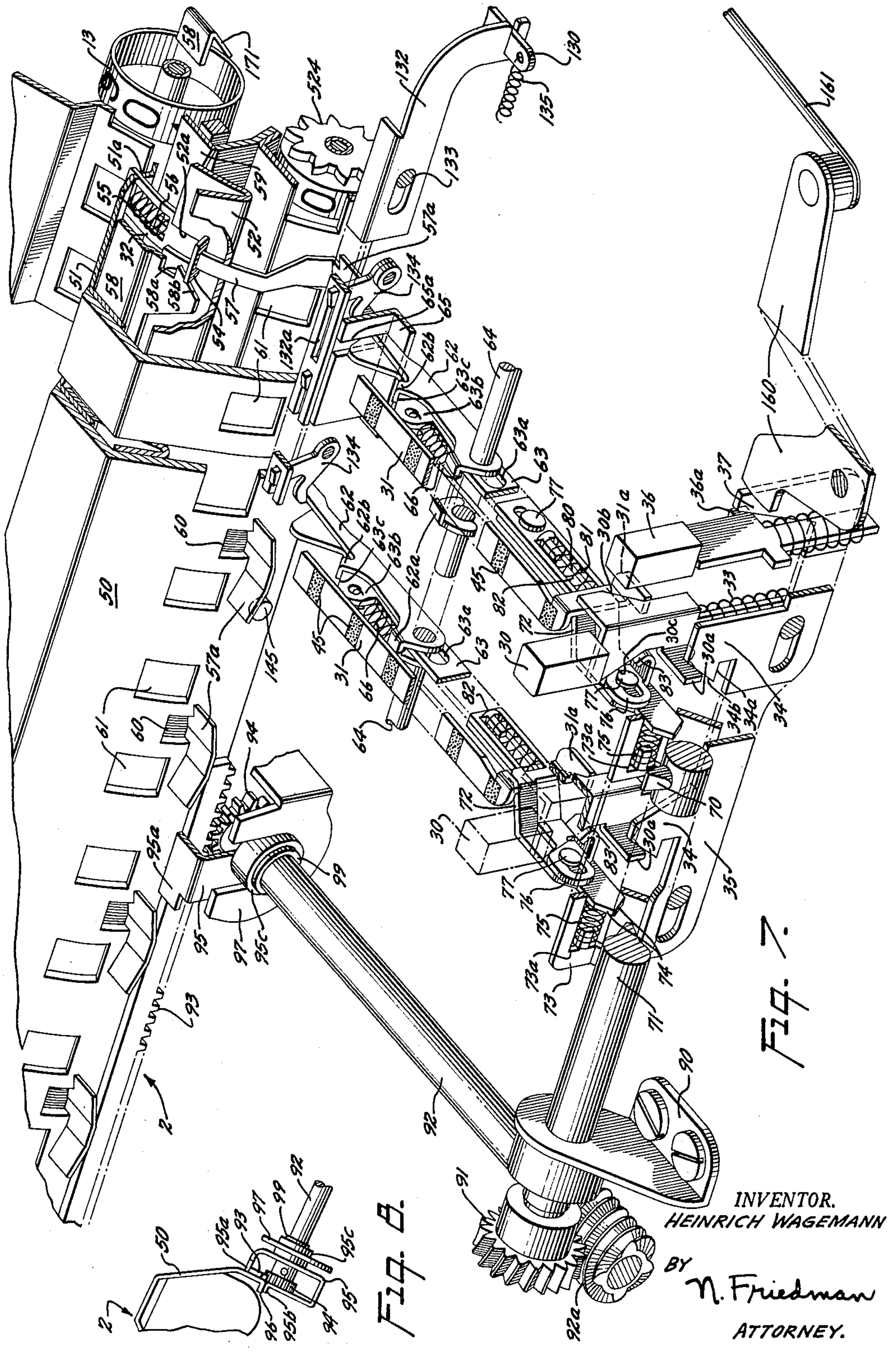
FIG. 7 is a perspective view showing the decimal keys and mechanism controlled thereby, and the drive train between the carriage and the decimal mechanism actuating shaft.
FIG. 8 is a fragmentary left side elevation showing in detail a portion of the last mentioned drive train.

In accordance with the present invention the keyboard of the machine is provided with a denominationally arranged row of decimal point keys 30 (FIGS. 1, 2, 7) which are located at the front of the keyboard intermediate the columns of the value keys 18. Depression of a selected decimal key will set a decimal marker 31 in the corresponding decimal place of the keyboard around which the factors of a calculation may be entered. A subsequent carriage shifting operation will cause the setting of a decimal marker 32 for the accumulator register 13 at twice the number of decimal places set on the keyboard, and will also cause automatic depression of the tab key 402 which is operable to terminate carriage shifting when the carriage stands shifted to the right a number of orders equal to the decimal places set on the keyboard.

From the previous general description of multiplication, it will therefore be seen that during a multiplication program, the automatically depressed tab key will be ineffective to terminate the successive rightward shifts of the carriage since such shifts are not initiated by depression of the right shift key 369. However, the return left shift automatically effected at the conclusion of the multiplication program is initiated by operation of shift key 370. This operation will accordingly be terminated by the operated tab key with the carriage standing shifted to the right a number of orders corresponding to the number of decimal places set on the keyboard. The set decimal indicator for the product registered in the accumulator register will therefore be in alignment with the keyboard decimal marker, permitting the addition and subtraction of values entered around the decimal position set on the keyboard.

The decimal mechanism of the present invention will also function in division, the dividend and divisor being entered through the keyboard around the decimal marker set thereon. The automatically set tab key 402 will serve to properly mark off the decimal point for the quotient registered in dials 85.

*Decimal Keys*

The decimal keys 30 are disposed in an ordinal row at the front of the keyboard, each decimal key being located between two adjacent rows of value keys 18. The decimal key array is of the flexible type wherein any key, when set by manual depression against the urge of its restoring spring 33, will release any previously set key and will itself then be latched in operated position. To this end, the stem of each key 30 is provided with a forward lug 30*a* adapted to be latched under a shoulder 34*a* of a related one of a series of upstanding projections 34 provided on an elongated transverse latching slide 35 which is spring urged to the left. Upon the depression of a decimal key, its lug 30*a* will first engage an inclined cam edge 34*b* of the associated projection 34, said cam edge terminating at shoulder 34*a* (FIG 7).. The latching slide is thus shifted to the right to release any previously set key and as the lug moves beneath shoulder 34*a*, the slide will be free to return to the left, latching the key in operated position.

A resetting key 36 is provided for releasing any operated decimal key 30, said key 36 being located adjacent the cluster of conventional register and keyboard clearing keys 465, 466, 467 to facilitate simultaneous manual depression of all said keys. Upon depression of key 36, a lug 36*a* thereof will engage a sloping cam surface of an upstanding projection 37 formed at the right end of latching slide 35. Slide 35 will thus be shifted to the right, thereby releasing any latched decimal key 30.

The decimal key stems are L-shaped in cross section to provide two arms at right angles. The rearwardly extending arm is formed with an inclined cam edge 30*b* which is operable, as will be described shortly, to set a keyboard decimal marker to active position. The lateral arm of the key stem is likewise provided with an inclined cam edge 30*c* which serves to condition the activating mechanism for the accumulator decimal markers 32 and the automatic depressing means for the tab keys 402, in a manner to be described subsequently.

*Keyboard Decimal Markers*

The depending stems of the digit keys 18 extend through aligned slots in upper and lower plates 40, 41

(FIG. 2) of the keyboard and are thereby guided for vertical movement, while the keybuttons protrude through suitable apertures formed in the keyboard cover plate 42. The elongated decimal marker slides 31 are disposed between adjacent columns of value keys 18 and are slidably supported just below cover plate 42 for longitudinal movement in aligned slots of transverse bars 43. Depending lugs 43*a* (FIG. 1) at the opposite ends of the bars are rigidly secured to plate 40 and support the bars some distance above the surface of the plate. Springs 44 normally maintain the slides in forward inactive position with depending offset lugs 31*a* (see also FIG. 7) of the latter engaging the stems of decimal keys 30.

Each slide 31 is provided with a series of transverse bands 45 of a color which contrasts markedly with the keyboard cover plate, the slide portions intermediate bands 45 being of a color which blends with the cover plate. In the normal unset position of the slides, bands 45 lie out of registration with sight openings 46 provided in the cover plate. However, upon depression of a selected decimal key 30, cam edge 30*b* thereof will shift the related slide to the rear and bring bands 45 into view through openings 46, thereby indicating a decimal point position on the keyboard. When the selected key 30 is subsequently released, spring 44 will restore the slide to unoperated position.

*Decimal Point Indicators for the Accumulator Register*

A transverse series of decimal point indicators or markers 32 is provided for the accumulator register 13. Since the number of decimal places in the accumulator register is always twice the number of places on the keyboard, the respective indicators 32 are located to the left of only the even orders of the register. Indicators 32 are housed in the forward part of the carriage casing. This portion of the carriage has the general configuration of an inverted channel 50, the rear wall 51 of which is provided with narrow openings 51*a* which slidably receive the rearward ends of the indicators 32. A transverse enlongated member 52 of V-cross section is rigidly welded to the inside of the forward wall of channel 50, and is formed in its rear wall with a plurality of downwardly extending slots 52*a*. Aligned transverse notches are provided in each marker 32, the forward end of the marker being bent upwardly along the notches to provide a lug 54. This lug extends into the member 52, the opposed side walls of slot 52*a* being slidably received in the notches and thereby serving to guide movement of the marker.

Markers 32 are normally maintained in forward unset position with their rearward ends substantially flush with the rear wall 51 of channel 50 by compression springs 55 which are disposed within elongated longitudinal apertures 56 provided in the markers. The forward end of spring 55 bears against the forward wall of aperture 56, and the opposite end abuts the inside face of said wall 51. Any marker is adapted to be projected rearwardly against the urge of spring 55 to decimal point indicating position by means of one of a series of pusher members 57. Members 57 comprise an upstanding portion which slidably extends through a suitable aperture in the base of V-member 52 and abuts the underside of lug 54. The lower widened end of the pusher member in bent laterally to form a horizontal offset tab 57*a* which extends outwardly through one of a series of openings 60 in the forward wall of the carriage casing, said openings being disposed intermediate pairs of the viewing openings 61 for the multiplier storage dials 524. Tab 57*a* is adapted to be raised from its normal lowered position by upward movement of the underlying rear end of one of an ordinal series of levers 62 provided between the columns of digit keys 18. Pusher member 57 will thus move the associated marker 32 rearwardly into decimal point indicating position as shown in broken lines in FIG. 1.

This operation will be effected, after depression of a decimal key, immediately upon shifting movement of the carriage from either direction to the denominational position where the number of carriage orders outboard of the first order of the keyboard equals the number of decimal places set on the keyboard. The shift can be initiated in any conventional manner. For example, if the fourth decimal key has been operated to set four decimal places on the keyboard, in a following carriage shift operation the fourth decimal place lever 62 will be raised as the carriage moves into the position where four orders thereof lie to the right of the units order of the keyboard. The pusher tab 57*a* for the carriage decimal marker 32 which lies to the left of the eighth order of the register will then lie above the lever which is located to the left of the fourth keyboard order. Accordingly, upward operating movement of said lever will set the eighth place decimal marker of the accumulator register to rearward active position.

In the manner to be described subsequently, operation of lever 62 to set a carriage decimal marker also serves to effect adjustment of devices of the invention to enable automatic depression of the tab stop key 402 corresponding to the current shifted position of the carriage.

Any operated decimal marker 32 is adapted to be latched in set position by means of shoulders 58*a* formed in forward projections of a transverse latching slide 58 which is located immediately above the markers and which has pin and slot connection with a plate 59 fixed in the carriage beneath the markers. Suitable spring means urges the latching slide to the right. In it rearward movement to operative latched position, lug 54 of a marker will first engage an inclined cam edge 58*b* of the latching slide and will thereby shift the slide to the left to release any previously operated marker.

*Operating Mechanism for the Accumulator Register Decimal Markers*

The mechanism whereby the appropriate lever 62 (FIG. 7) is operated in properly timed relation to the shifting of the carriage to set a carriage decimal marker 32 will now be described. Disposed beneath each keyboard decimal marker 32 is an elongated interponent slide 63 which extends the length of the keyboard and is supported on plate 40 beneath the bars 43 which support said markers. Each slide 63 is formed with an intermediate elongated aperture 63*a* by which it is slidably supported on a transverse shaft 64 rigidly secured to keyboard plate 40. The front end of lever 62 is bent to form an inverted U-portion 62*a* which pivotally mounts the lever on shaft 64, and through which slide 63 extends to the rear alongside the lever. The rearward ends of the slide and lever project through a related one of a series of vertical guide slots 65*a* of a transverse support bracket 65 secured to plate 40. It will be noted that the portion of the slide which cooperates with slot 65*a* is widened to form an upstanding nose thereby insuring proper guided movement of the slide.

Between this nose and aperture 63*a*, slide 63 includes an upstanding projection 63*b* having an inclined cam edge 63*c* contacted by an offset lug 62*b* of lever 62. A tension spring 66 connected between the slide projection 63*b* and U-portion 62*a* of the lever normally maintains the slide in forward position and the lever in clockwise position as seen in the drawings. Means are provided which are operable to shift in rearward direction the slide underlying the decimal marker set on the keyboard, this operation being effected upon movement of the carriage to the shifted position wherein the number of right-hand outboard orders of the carriage equals the number of decimal places set on the keyboard. Such rearward movement of the slide will cause cam edge 63*c* to rock lever 62 counterclockwise about shaft 64 whereby the free end of the lever will raise the then overlying pusher tab 57*a* and thus set a carriage decimal marker 32 for the accumulator register. It will be apparent that in view of the timing of this operation to occur as indicated above, the decimal marker set on the carriage will be at twice the number of decimal places set on the keyboard.

The appropriate interponent slide 63 is adapted to be shifted to the rear at the proper time by means of one of a series of radially extending tapered teeth 70, one for each decimal order, helically arranged along an elongated shaft 71 which is supported for rotation on and extends across the front of keyboard plate 40. The forward tips of slides 63 are normally located just to the right and out of the path of the cooperable teeth 70; however, upon depression of a decimal key 30, the associated slide is shifted to the left to place its tip in the path of tooth movement. A suitable reduction drive train, to be described subsequently, provided between the carriage 2 and shaft 71 effects rotation of the latter in response to shifting movement of the former. As viewed from the right-hand side of the machine the shaft rotation will be clockwise for right-hand shifting movement and counterclockwise for left-hand shifting movement. The pitch of the helical locus along which teeth 70 are disposed, and the reduction ratio of the drive train are so correlated that as the carriage shifts from order to order, successive teeth 70 swing past their cooperable slides 63. The arrangement is such that as the carriage moves from either direction into any position, the tooth 70 for the keyboard decimal place equal to the number of right-hand outboard carriage orders will swing past the tip of its related slide 63. For example, as the carriage is shifted rightwardly from its leftmost position shown in the drawings, when the carriage shifts one order to the right the first or rightmost tooth 70 will swing downwardly past the first slide 63; when the carriage shifts another step the second tooth will move past the tip of the second slide, etc. In similar fashion, successive lower order teeth 70 will swing upwardly past their related slides as the carriage is shifted to the left.

The forward ends of slides 63 are parallel to the major body portions thereof but are offset to the left by an intermediate lateral bend 72. The forward tips of the slides extend through slots 73*a* of a transverse elongated bar 73 secured to the keyboard plate 40, and terminate in intersecting oppositely inclined cam edges 74, either of which edges is adapted to be engaged by a tooth 70 to cause rearward movement of the slide depending upon the direction of carriage shift. That is to say, if the carriage is shifting to the right, shaft 71 will be driven clockwise (FIGS. 2, 7) whereby the upper cam edge 74 of an enabled slide 63 will be engaged by the related tooth 70 and thereby shifted to the rear. Conversely, leftward shifting movement of the carriage will effect counterclockwise rotation of shaft 71 whereby tooth 70 will operate on the lower cam edge 74.

Depression of a decimal key 30 is effective to condition the corresponding slide 63 for operation by its tooth 70 as follows. The forward ends of said slides are normally maintained in inactive position just to the right of the paths of the respective operating teeth 70 by compression springs 75. Each spring is supported on opposed facing lateral lugs which extend toward each other from the left end wall of slot 73*a* and the left side face of slide 63, the right-hand wall of the slot serving to limit rightward movement of the slide. A short longitudinal link 76 is coupled at its ends to the forward portion of each slide 63 by means of pin and slot connections 77. Link 76 is bent laterally intermediate its ends and extends through a downwardly opening longitudinal slot cut in the lateral bend 72 of the slide whereby the front and rear portions of the link lie to the right and left respectively of the slide. Elongated longitudinal apertures 80 and 81 are provided in the rear portion of link 76 and the adjacent portion of slide 63, the front end of the slide aperture 81 terminating a short distance in front of aperture 80. A light compression spring 82 is contained in said pair of apertures, and is supported at its ends on respective lugs which extend rearwardly from the front of slot 80 and forwardly from the rear of slot 81. Link 76 is thereby resiliently maintained in forward position relative to slide 63 as limited by the slots of the pin and slot connections 77 between these members, as seen in the drawings.

An inclined upstanding lug 83 is laterally offset from the front end of link 76 and normally underlies the lateral cam edge 30*c* of decimal key 30. Upon depression of the key, said cam edge will engage lug 83 and will shift link 76 together with slide 63 to the left against the action of spring 75 to place the intersecting terminal cam edges 74 of the slide in the rotary path of tooth 70. It may be noted that the forward end of slide 63 is capable of this limited lateral movement since lever 62 is freely supported on shaft 64 and there is some lateral clearance provided between guide slot 65*a* and the combined thicknesses of the rear ends of slide 63 and lever 62. When the carriage shifts to the proper position as described earlier, tooth 70 will engage the upper or lower cam edge 74 of the enabled slide 63 and shift the slide to the rear, thus elevating lever 62 to set a carriage decimal marker 32 for the accumulator register 13. Link 76 will be moved in rearward direction with the slide, carrying lug 83 of the link to the rear of cam edge 30*c* after the carriage decimal marker has been set. Thereupon spring 75 will immediately shift said slide and link to the right, positioning lug 83 behind the stem of the depressed decimal key and moving the slide out of the range of tooth 70. Spring 66 connected between lever 62 and slide 63 will now return these parts to their respective normal positions, the link 76 however being held blocked in rearward position by its lug 83 disposed behind cam edge 30*c* of key 30. The forward normalizing movement of the slide while link 76 is so blocked is permitted by their pin and slot connections 77 between the two, and is effective to increase the degree of compression of spring 82 between these parts. When the decimal key 30 is thereafter restored to inactive position, thereby freeing lug 83, spring 82 will accordingly operate to return the link to its normal forward position on slide 63.

The drive train between the carriage and shaft 71, which train properly relates the angular position of the shaft to the shifted position of the carriage, will now be described. Shaft 71 is rotatably journalled at its ends in brackets 90 which are supported at the opposite sides of the front of keyboard plate 40. Fixed to the left end of the shaft is a worm wheel 91 which is meshed with a worm 92*a* of a transmission shaft 92 extending lengthwise of the fixed frame of the machine to the rear portion of the keyboard. An elongated transverse rack 93 is fixed to the forward lower edge of the carriage casing member 50 for shifting movement therewith. Rack 93 meshes with a pinion 94 secured to the end of shaft 92; hence, shifting of the carriage will drive shaft 92 which in turn will operate shaft 71 through the worm and wheel connection 91, 92*a*.

As described in detail in Patent 2,531,207, in a shifting operation the carriage is raised a short distance to partially unmesh the intermediate gears 545*a* of the carriage from intermediate gears 545 carried by the fixed frame (FIG. 2), said gears serving to drive the numeral wheels 13 from the differential actuator gears 5. In order to insure that the proper phase relationship is maintained between the shifted position of the carriage and the angular position of shaft 71, it is desirable that pinion 94 of shaft 92 be in continuous full mesh with the carriage rack 93. Accordingly, the rearward end of shaft 92 is constrained for upward movement with the carriage in a shifting operation. For this purpose there is provided a cage 95 formed with vertically spaced lips 95*a*, 95*b* (FIG. 8), and having a forwardly extending bearing hub 95*c* in which shaft 92 is journalled for rotation. A stop washer 99 fixed on shaft 92 is engaged by hub 95*c* thereby serving to block cage 95 against forward movement. Said lips 95*a*, 95*b* closely and slidably embrace the rails provided respectively by the upper longitudinal edge of rack 93 and the lower inturned rim 96 of casing member 50. Hub 95c extends between the arms of a yoke 97 carried by the fixed frame and is thereby held against lateral movement. The forward end of shaft 92 is journalled in a transverse arm of a bracket 98 (FIG. 1) mounted on keyboard plate 40. It will thus be seen that when the carriage 2 (and therefore cage 95) is raised upon initiation of a shift, the forward end of shaft 92 will be elevated therewith, maintaining pinion 94 in continuous mesh with rack 93. The very slight vertical movement of the front end of the shaft, which is an incident of this operation, will be permitted by flexing of plate 40.

*Automatic Depression of a Tabulating Stop Key*

As was briefly mentioned earlier, the upward operating movement of a lever 62 to set a carriage decimal marker 32 is also effective to cause depression of the tab stop key 402 corresponding to the current denominational position of the carriage. Taking a specific case, if four decimal places are set on the keyboard by depression of the fourth decimal key 30, upon movement of the carriage into the position where the first four orders thereof stand outboard to the right of the keyboard, the fourth lever 62 will be operated to set the eighth place accumulator register decimal marker 32, in the manner described before. This operation of the lever 62 will also cause a bell crank 110 (FIGS. 1, 5, 10) to swing downwardly into engagement with the offset lug 461 of a fourth place tab key 402, thereby setting said tab key. In like fashion, depression of a decimal key to set any selected number of decimal places on the keyboard, followed by a carriage shift, will cause the setting of the corresponding tab key 402 when the carriage moves into that position where said selected number of orders thereof lie to the right of the units order of the keyboard.

Bell crank 110 is loosely pivoted on the righthand end portion of a shaft 111 mounted in the fixed framing to the rear of carriage 2. A spring 112 normally biases the bell crank to clockwise position, in which position a shoe 110a formed on the forward arm thereof lies just above the plane of lugs 461 of the tab keys. The bell crank 110 is mounted in such transverse location on shaft 111 that as the carriage shifts into any position, shoe 110a will be in registration with the lug 461 of the tab key for that position. Referring to FIGS. 1 and 10, the carriage is there shown in leftmost or first position with the shoe above the fixed right-hand shift terminating lug 460. If the carriage is shifted one order to the right into second position the lug 461 of the tab key for that position (i.e., the rightmost tab key 402, which will serve to terminate the shift in second position) will move beneath such shoe. Similarly if the shift continues another step to the right into third position, the lug 461 of the next tab key will move beneath shoe 110a, and so on.

The upward operating movement of lever 62 which is effected by one of teeth 70 to set a decimal marker 32, is also effective to cause operation of bell crank 110 as follows.

It will be recalled from the previous description of the carriage shifting mechanism that a shift is initiated by breaking toggle 362 for the purpose of disengaging clutch 352 and engaging clutch 353. A transverse shaft 113 mounted in the fixed framing to the rear of toggle 362 carries a fixed block 114 (FIGS. 1, 9, 10) into whose upper surface is threaded a vertical screw 115. Pivotally mounted on screw 115 are two adjacent levers, one above the other, designated as 116 and 117. The lower lever 116 comprises a rightwardly extending arm 116a to the end of which is secured a vertical stud 116b, and also includes a leftwardly extending portion 116c. The upper lever 117 includes a short forward portion teminating in an upstanding lug 117a, and an elongated arm 117b which extends to the right (left in FIG. 10) where it terminates in an upturned projection 117c. As stated earlier, bell crank 110 is normally biased clockwise by spring 112. The depending vertical leg of the bell crank engages elongated arm 117b thereby holding lever 117 in the clockwise position seen in the drawings, a suitable stop means (not shown) serving to restrain said lever and therefore the bell crank against further clockwise movement. Connected between lug 117a and stud 116b is a relatively heavy tension spring 118 which urges levers 116, 117 toward each other as limited by a collar on the stud abutting the rear edge of lever 117.

Rigid with the inner end of link 362a of the friction clutch toggle 362 is an upstanding projection 125 which lies just to the rear of arm 116c of lever 116. When the toggle is broken to initiate a shift, projection 125 will swing forwardly, rocking lever 116 counterclockwise to the position shown in FIG. 9. Spring 118 will tend to urge lever 117 in like direction to operate bell crank 110 and thereby effect depression of a tab key 402. However, lever 117 is normally held blocked against such movement by suitable means to be described shortly, and spring 118 will accordingly merely yield to allow counterclockwise movement of said lever, thereby increasing the tension in the spring. Upon movement of the carriage into the appropriate denominational position, as determined by a depressed decimal key 30, the blocking means will be disabled by upward movement of lever 62 whereupon spring 118 will snap lever 117 to the rear position shown in dot-dash lines in FIG. 9, causing arm 117b to rock bell crank 110 counterclockwise for depression of a tab key.

The aforementioned blocking means for lever 117, and the associated control mechanism will now be described. Provided on the right side of the machine is a longitudinal lever 130 pivotally connected intermediate its ends at 131 to the fixed framing beneath the carriage. The forward end of this lever is received in a horizontal slot formed in the depending end of a transverse slide 132 which extends across the rear portion of the keyboard and which has pin and slot connections 133 with the framing to allow limited lengthwise movement thereof. Slide 132 is provided with a series of longitudinal slots 132a through each of which extends one arm of an underlying pivoted bell crank 134. One such bell crank is provided for each lever 62, the lateral arms of the cranks extending above their respective cooperable levers. A spring 135 connected to the forward end of lever 130 normally biases the lever to the clockwise position shown in the drawings, holding slide 132 shifted to the left with the vertical arm of each bell crank engaging the right-hand end wall of a slot 132a, and the lateral arm of the bell crank abutting lever 62.

The opposite end of lever 130 is formed with a lateral offset terminating in a depending blocking lug 136 which, in the normal clockwise position of said lever, lies just to the rear of the upturned end of arm 117b, thereby serving as the blocking means for lever 117 referred to before.

Lever 130 will be effective to prevent lever 117 from operating bell crank 110 under the urge of spring 118 until the carriage moves into the denominational position where the number of right-hand outboard orders thereof equals the number of decimal places set on the keyboard by depression of a selected decimal key 30. At that time and in the manner described earlier, a tooth 70 on shaft 71 will shift to the rear the slide 63 of the selected decimal order, thereby elevating lever 62 to set a decimal marker 32 for the accumulator register 13. The operating movement of lever 62 will rock its associated bell crank 134 clockwise, shifting slide 132 to the right whereby lever 130 will be rocked counterclockwise to remove lug 136 thereof from the path of arm 117b. Spring 118, previously tensioned by counterclockwise movement of lever 116 caused by the breaking of toggle 362, will thereupon swing said arm 117$b$ in rearward direction rocking bell crank 110 counterclockwise to set the current tab key 402. In like fashion, operation of a lever 62 of any decimal order will disable blocking lever 130 and thereby permit the setting of the pertinent tab key. It should be noted that the above described disablement of blocking lug 136 is timed to occur sufficiently early in the shift cycle that the set tab key will be effective to terminate the shift if the shift has been initiated in a manner which will allow the key to perform its terminating function.

Immediately after operating, slide 132 and lever 130 will be restored to normal by spring 135 since members 63 and 62 are returned to unoperated condition immediately after being operated by a tooth 70, as described hereinbefore. However, arm 117$b$ is still held in rearward position inasmuch as the toggle 362 remains broken. When the toggle is subsequently reset at the termination of the shift cycle, spring 112 will be effective to return bell crank 110 and levers 116, 117 to home position. To allow the necessary forward return movement of arm 117$b$ even though it now lies to the rear of the already normalized lever 130, the upturned end of said arm is formed with a laterally inclined cam surface 137 which will engage the inner edge of blocking lug 136 and rock said lever 130 a short distance counterclockwise permitting arm 117$b$ to return in front of said lug.

If for any reason the carriage shift is not terminated in the denominational position where bell crank 110 is operated to set a tab key 402, it will be seen that said crank will remain in operated position whereby the crank shoe 110$a$ will be trapped beneath the lugs 461 of the unset tab keys as the shift continues, since toggle 362 is not reset. This situation could occur if the automatic tab key setting is effected during a multiplier entry operation wherein the preliminary shift continues to leftmost position even though a tab key is set; or could occur if the automatic tab key setting is effected during multiplication and the multiplier contains a zero just to the left of the decimal point. With regard to this latter case, it will be recalled that after any given multiplier dial is counted back to zero, the carriage shifts continuously to the right until a multiplier dial containing a significant digit is brought into alignment with the units order of the keyboard for a counting-out operation.

To prevent the above described trapping of the bell crank shoe 110$a$, the following means are provided to normalize the bell crank if the carriage shift continues after said bell crank has operated to set a tab key. Mounted on the rear of carriage 2 is a longitudinal comb 140 formed with spaced tapered teeth 141 whose sides comprise oppositely inclined cam edges 141$a$, 141$b$. Secured to the forward arm of bell crank 110 by a suitable bracket is a roller follower 142 which is normally disposed at a level tangent to the upper edge of comb 140. When the carriage stands in either of its extreme shifted positions, the corresponding untoothed end portions of the comb will underlie roller 142, and as the carriage is shifted to any of its intermediate positions a corresponding intertooth space will move to position beneath the roller to permit the bell crank to operate for automatic depression of a tab key as described earlier. Upon operation of the bell crank, roller 142 will descend into the space between two adjacent oppositely inclined cam edges 141$a$, 141$b$. Should the shift be terminated at this time the resetting of toggle 362 will be effective to restore the bell crank to unoperated position in the manner described before.

However, should the shift not be terminated the toggle will remain broken and consequently will be ineffective to normalize the bell crank. In this event, as the shift continues one or the other of said cam edges 141$a$, 141$b$—depending upon the direction of carriage movement—will engage roller 142 and will swing the bell crank together with lever 117 back to home position before one step of shifting movement has been completed, lever 116 being held blocked in operated position by lug 125 of the toggle link 362$a$. In its rearward movement, cam surface 137 formed on the upturned end 117$c$ of lever arm 117$b$ will operate in the aforedescribed fashion to enable said arm and the bell crank to return to normal blocked position in front of lug 136 of lever 130. Upon subsequent termination of the shift, toggle 362 will be reset allowing lever 116 to return to home position under the urge of spring 113.

*Multiplication*

From the foregoing description, it will be understood that if a multiplication program is initiated after manual depression of a decimal key to set a selected number of decimal places on the keyboard, the appropriate accumulator decimal marker 32 and tab key 402 will be set either during the left shift incident to multiplier entry or during the right shifts effected during the calculation, depending upon the initial position of the carriage. If, when key 526 is operated to enter the multiplier, the carriage stands shifted to the right with a number of orders at least equal to the number of decimal places set on the keyboard standing outboard of the units order of the keyboard, then the left shift will cause setting of a marker 32 and tab key 402. However, should the carriage initially stand to the left of the above noted position, the pertinent operating tooth 70 will have already moved past the forward tip of its slide 63, so that only during the subsequent right-hand shifts which are effected during the calculation will the carriage pass through the proper position wherein the tooth 70, moving clockwise, will be effective to operate slide 63 and thereby set an accumulator decimal mark and a tab key.

As was mentioned in the previous general description of multiplication, the set tab key 402 will be ineffective to terminate either the left shift of multiplier entry or the right shifts of the calculation. The tab key, however, will be effective during the left shift which terminates the multiplication program since this shift is initiated by depression of shift key 370. Hence, the carriage will finally come to rest with the accumulator decimal indicator 32 set thereon aligned with the operated keyboard decimal marker slide 31. Thereafter values can be entered around the decimal point set on the keyboard and added to or subtracted from the product appearing in the accumulator register 13.

Earlier, in the general description of the multiplication control mechanism, brief mention was made that the machine of the present invention is modified to provide that in a multiplication calculation the carriage shift will always continue to the right end position. This feature is desirable when a decimal fraction multiplier is employed immediately after the setting of a decimal key 30.

Assume that a given number of decimal places (say, four) has been set on the keyboard and that a multiplier which is a decimal fraction, e.g., ".0321" is then entered into the multiplier storage mechanism to control a multiplication program. With the prior art machine of Patent 2,531,207, the calculation would be terminated by clockwise movement of bail 641 immediately upon the highest significant digit "3" being counted out of its multiplier storage dial 524. Thus the rightward shifting movement of the carriage would be terminated in fourth position whereby the decimal mechanism could not operate to set the eighth place decimal marker 32 and the fourth place tab key 402, inasmuch as the carriage had not moved to fifth position. To avoid this undesirable result when a decimal multiplier value is used following a decimal key set-up operation, means are provided to cause the carriage to invariably continue its right-hand shifting movement to the extreme end position in multiplication, as follows.

Referring to FIG. 4, a latch 143 is pivotally mounted in front of the right-hand end portion of bail 641. Latch 143 is normally biased clockwise by a suitable spring into blocking relation with a shoulder 144 of the bail whereby the latter is prevented from rocking clockwise to terminate multiplication. Bail 641 will be so held until just before the carriage commences to move into its rightmost position. At this point, a pin 145 fixed to the forward edge of the carriage for movement therewith will engage an upstanding portion 143*a* of the latch, rocking the latter clockwise to free bail 641 which will thereupon operate in its usual fashion to terminate the calculation. FIG. 4 shows the position of pin 145 relative to the latch portion 143*a* when the carriage is one order to the left of its right end position.

*Division*

The decimal point mechanism of the present invention is operable in connection with division as follows. If a division calculation follows the last described multiplication operation, the carriage will be in the intermediate position corresponding to the automatically depressed tab key when the dividend is entered around the keyboard decimal point. As mentioned previously in the general description of division, initiation of a dividend entering operation by depression of key 468 will now be ineffective to cause a rightward carriage shift, and accordingly the dividend will be entered in the accumulator 13 in proper position relative to the set decimal marker 32 thereof. The divisor is then entered on the keyboard around the decimal point set thereon, and the calculation initiated. The quotient will be registered in the counter register 85, the depressed tab key serving to indicate the decimal point position for the quotient. For example, assume that four decimal places have been set on the keyboard, followed by a multiplication calculation during which the eighth place accumulator decimal marker 32 and the fifth denominational position tab key 402 (numbered "4" in FIG. 1) will be set. It will be noted that the tab key lies between the fourth and fifth orders of the counter register 85. At the conclusion of the multiplication program, the carriage will come to rest in fifth position with the eighth place accumulator decimal marker aligned with the fourth place operated keyboard decimal slide 31. If a division calculation, e.g., 4.22÷2 is then to be carried out, the factors are entered through the keyboard in normal fashion around the fourth decimal place. The quotient "2.11" will be registered in the fifth, fourth and third orders respectively of the counter register, the depressed tab key properly setting off the decimal point between fourth and fifth counter orders.

Should a division calculation be the first operation initiated after a decimal key is depressed, the setup of an accumulator marker 32 and tab key 402 will be effected during the preliminary shift to the right which is incident to dividend entry, the tab key being effective immediately upon its depression to terminate the shift in the intermediate position where the carriage and keyboard decimal markers are aligned for entry of the factors. In this situation it will be understood that just before the dividend entry operation is initiated, the carriage should be in a position to the left of said last mentioned intermediate position. After set-up of the factors, the calculation per se is performed in the usual manner.

*Joint Resetting of the Decimal Markers and Tab Keys*

If the operator has effected a given decimal marker and tab key set-up by depression of a decimal key 30 followed by a carriage shift, and then at some future time desires to change the decimal point setting, it is necessary that a different key 30, corresponding to the desired new setting, be depressed. As described hereinbefore, depression of the second key will be effective to release the previously operated and latched key, and will therefore also be effective to allow normalizing of the originally set keyboard decimal marker 31 by spring 44.

As a desirable ancillary feature of the invention, means are provided which will automatically release any previously operated accumulator decimal marker 32 and tab key 402 in response to depression of a decimal key 30 or the decimal resetting key 36, thereby clearing the mechanism for a new set-up.

It will be recalled that any key 30 is held depressed in operated position by latching slide 35, and that the slide is cammed to the right by depression of any other key 30 or resetting key 36 to release the previously latched key. This rightward movement of the latching slide is employed to shift in leftward releasing direction the latching slides 58 and 462 for the accumulator markers 32 and tab keys 402 respectively.

For this purpose, there is provided a bell crank 160 (FIGS. 1, 5, 7) pivotally mounted at the lower right-hand corner of the keyboard. One leg of the bell crank abuts the rightmost end of the decimal key latching slide 35, and the other leg thereof is connected by an elongated rearwardly extending rod 161 to an arm of a U-member 162 (see also FIG. 10) loosely mounted for rotation on shaft 113. Rockably mounted on shaft 111 by means of inturned arms 163*a* is a bail 163. As best seen in FIG. 10, the near arm 163*a* includes a depending extension provided at its lower end with a lateral pin 164 which is adapted to be engaged by the far arm of U-member 162.

A lever 165 is pivotally mounted intermediate its ends on a pin 166 secured on the rear of the carriage 2, said lever having depending opposite end portions 165*a*, 165*b*, the portion 165*a* terminating in a horizontal lug adapted to be engaged by bail 163. The bail—which is mounted on the fixed framing—is of sufficient length that regardless of the shifted position of the carriage, the lug—which is a part of lever 165 and therefore shiftable with the carriage—will nevertheless be over some portion of the bail.

From the foregoing description, it will be apparent that when latching slide 35 is cammed to the right upon depression of a decimal key 30 or resetting key 36, bell crank 160 will be rocked clockwise, swinging U-member 162 counterclockwise whereby bail 163 will be swung upward about shaft 111 as an axis causing lever 165 to rotate counterclockwise about pin 166. A forwardly extending stud 167 fixed to the lever is cooperable with a sloping cam edge formed at the end of latching slide 462, and will thereupon shift slide 462 to the left (right in FIG. 10), releasing any operated tab key 402.

The counterclockwise movement of lever 165 will also be effective to shift latching slide 58 to the left to release an operated accumulator decimal marker 32. To this end, a lever 170 is pivotally mounted on the right end framing plate of the carriage. The rear upstanding end of the lever is engaged by the depending end portion 165*b* of lever 165, and the opposite end of the lever contacts the downturned inwardly sloping end 171 of slide 58. Hence, counterclockwise movement of lever 165 to clear the tab keys 402 is also effective to rotate lever 170 clockwise, whereby slide 58 is operated to clear the decimal markers 32.

Although a specific embodiment of the invention has been described in the foregoing specification, it should be understood that this disclosure is made in an illustrative and not a limiting sense, since various omissions and substitutions and changes in the form and details of the device illustrated and in its mode of operation can be made by those skilled in the art without departing from the spirit of the invention. Further, various subcombinational features of the invention disclosed herein possess utility apart from their use in the decimal mechanism of the present invention.

It is the intention, therefore, to be limited only as indicated by the scope of the following claims.

I claim:

1. In a calculating machine having a fixed frame including a keyboard, a denominationally shiftable carriage carrying an accumulator register, means for shifting said carriage, and denominationally settable tabular stop means for controlling termination of shifting of said carriage upon movement thereof into the denominational position corresponding to the setting of said stop means; ordinally adjustable decimal point indicating means for said keyboard, adjusting means settable to control selective ordinal adjustment of said indicating means to indicate a decimal point position for said keyboard, setting means for effecting a selective denominational setting of said tabular stop means controlled by the selected ordinal adjustment of said indicating means, and a manually operable control key effective to initiate operation of said carriage shifting means, said settable adjusting means being ineffective to initiate operation of said carriage shifting means.

2. The invention according to claim 1, including a denominational series of manually operable keys for setting said tabular stop means.

3. In a calculating machine having a fixed frame including a keyboard, a denominationally shiftable carriage carrying an accumulator register, means for shifting said carriage, and denominationally settable tabular stop means for controlling termination of shifting of said carriage upon movement thereof into the denominational position corresponding to the setting of said stop means; ordinally adjustable decimal point indicating means for said keyboard, adjusting means settable to control selective ordinal adjustment of said indicating means to indicate a decimal point position for said keyboard, setting means for effecting a selective denominational setting of said tabular stop means controlled by the selected ordinal adjustment of said indicating means, and a denominational series of manually operable keys carried by said carriage for setting said tabular stop means.

4. The invention according to claim 3, said adjusting means comprising an ordinal series of manually operable keys mounted on said fixed frame.

5. In a calculating machine having a fixed frame including a keyboard, a denominationally shiftable carriage carrying an accumulator register, means for shifting said carriage, and denominationally settable tabular stop means for controlling termination of shifting of said carriage upon movement thereof into the denominational position corresponding to the setting of said stop means; ordinally adjustable decimal point indicating means for said keyboard, adjusting means settable to control selective ordinal adjustment of said indicating means to indicate a decimal point position for said keyboard, setting means for effecting a selective denominational setting of said tabular stop means determined by the selected ordinal adjustment of said indicating means, means for operating said last mentioned setting means, said operating means including normally disabled interponent means, means responsive to operation of said adjusting means for enabling said interponent means, and a manually operable control key effective to initiate operation of said carriage shifting means, said settable adjusting means being ineffective to initiate operation of said carriage shifting means.

6. In a calculating machine having a fixed frame including a keyboard, a denominationally shiftable carriage carrying an accumulator register, means for shifting said carriage, and denominationally settable tabular stop means for controlling termination of shifting of said carriage upon movement thereof into the denominational position corresponding to the setting of said stop means; ordinally adjustable decimal point indicating means for said keyboard, adjusting means settable to control selective ordinal adjustment of said indicating means to indicate a decimal point position for said keyboard, setting means for effecting a selective denominational setting of said tabular stop means determined by the selected ordinal adjustment of said indicating means, means for operating said last mentioned setting means, said operating means including a series of interponent members each related to a different decimal position for said keyboard, means responsive to operation of said adjusting means for enabling the corresponding interponent member, and a manually operable control key effective to initiate operation of said carriage shifting means, said settable adjusting means being ineffective to initiate operation of said carriage shifting means.

7. In a calculating machine having a fixed frame including a keyboard, a denominationally shiftable carriage carrying an accumulator register, means for shifting said carriage, and denominationally settable tabular stop means for controlling termination of shifting of said carriage upon movement thereof into the denominational position corresponding to the setting of said stop means; ordinally adjustable decimal point indicating means for said keyboard, adjusting means settable to control selective ordinal adjustment of said indicating means to indicate a decimal point position for said keyboard, setting means for effecting a selective denominational setting of said tabular stop means determined by the selected ordinal adjustment of said indicating means, means for operating said last mentioned setting means, said operating means including a series of interponent members each related to a different decimal position for said keyboard and further including actuating means driven by said carriage, and means responsive to operation of said adjusting means for enabling the corresponding interponent member.

8. In a calculating machine having a fixed frame including a keyboard, a denominationally shiftable carriage carrying an accumulator register, means for shifting said carriage, and denominationally settable tabular stop means for controlling termination of shifting of said carriage upon movement thereof into the denominational position corresponding to the setting of said stop means; first ordinally settable decimal point indicating means for said keyboard, second ordinally settable decimal point indicating means for said accumulator register, adjusting means settable to control selective ordinal setting of said first indicating means to indicate a decimal point position for said keyboard, setting means for effecting selective setting of said tabular stop means and said second indicating means as determined by the setting of said first indicating means, and a manually operable control key effective to initiate operation of said carriage shifting means, said settable adjusting means being ineffective to initiate operation of said carriage shifting means.

9. The invention according to claim 8, said keyboard comprising ordinally arranged columns of keys, said first decimal point indicating means being operable to indicate a decimal point position on said keyboard between said columns of keys.

10. In a calculating machine having a fixed frame including a keyboard, a denominationally shiftable carriage carrying an accumulator register, means for shifting said carriage, and denominationally settable tabular stop means for controlling termination of shifting of said carriage upon movement thereof into the denominational position corresponding to the setting of said stop means; first ordinally settable decimal point indicating means for said keyboard, second ordinally settable decimal point indicating means for said accumulator register, adjusting means settable to control selective ordinal setting of said first indicating means to indicate a decimal point position for said keyboard, setting means for effecting selective setting of said tabular stop means and said second indicating means as determined by the setting of said first indicating means, said keyboard comprising ordinally arranged columns of keys, said first decimal point indicating means being operable to indicate a decimal point position on said keyboard between said columns of keys, said second decimal point indicating means being mounted on said carriage.

11. The invention according to claim 10, wherein said last mentioned setting means is effective to set said second indicating means to indicate a number of decimal places for the accumulator register different from the number of decimal places set on said keyboard by said first indicating means.

12. The invention according to claim 11, wherein said last mentioned setting means is effective to denominationally set said tabular stop means to terminate shifting of the carriage in that denominational position thereof where the set decimal point positions on the keyboard and the carriage are in alignment.

13. In a calculating machine having a fixed frame including a keyboard, a denominationally shiftable carriage carrying a counter register, means for shifting said carriage, and denominationally settable tabular stop devices for controlling termination of shifting of said carriage upon movement thereof into the denominational position corresponding to the setting of said stop devices; first settable decimal point indicating means for said keyboard, second settable decimal point indicating means for said counter register, means for setting said first indicating means to indicate a selected number of decimal places for the keyboard, and means for (1) setting said second indicating means to indicate a like number of decimal places for the counter register and (2) denominationally setting said tabular stop devices.

14. In a calculating machine having a fixed frame including a keyboard, a denominationally shiftable carriage carrying a counter register, means for shifting said carriage, and denominationally settable tabular stop devices for controlling termination of shifting of said carriage upon movement thereof into the denominational position corresponding to the setting of said stop devices; first settable decimal point indicating means for said keyboard, second settable decimal point indicating means for said counter register, means for setting said first indicating means to indicate a selected number of decimal places for the keyboard, means for (1) setting said second indicating means to indicate a like number of decimal places for the counter register and (2) denominationally setting said tabular stop devices, said second indicating means comprising a denominational series of manually operable keys mounted on said carriage, said keys being manually operable to set said stop devices.

15. In a calculating machine having a fixed frame, a denominationally shiftable carriage carrying an accumulator register, and means for shifting said carriage between left and right endmost positions; the combination of denominationally settable tabular stop means carried by said carriage for controlling termination of shifting of said carriage upon movement thereof into a selected one of a plurality of denominational positions including positions adjacent the leftmost position of said carriage, said selected one denominational position determined by the setting of said stop means, with manually operable setting means carried by said fixed frame for controlling selective denominational setting of said tabular stop means to terminate shifting movement of said carriage at any one of said plurality of denominational positions.

16. In a calculating machine having a fixed frame, a denominationally shiftable carriage carrying an accumulator register, means for shifting said carriage between left and right endmost positions, and denominationally settable tabular stop means for controlling termination of shifting of said carriage upon movement thereof into a selected one of a plurality of denominational positions including positions adjacent the leftmost position of said carriage, said selected one denominational position corresponding to the setting of said stop means; first manually operable means carried by said carriage for controlling selective denominational setting of said stop means to terminate shifting movement of said carriage at any one of said plurality of denominational positions, and second manually operable means carried by said fixed frame for controlling selective denominational setting of said tabular stop means to terminate shifting movement of said carriage at any one of said plurality of denominational positions.

17. In a calculating machine having a fixed frame including a keyboard, a denominationally shiftable carriage carrying an accumulator register, and means for shifting said carriage; first ordinally settable decimal point indicating means for said keyboard, second ordinally settable decimal point indicating means for said accumulator register, said second decimal point indicating means being carried by said carriage, adjusting means ordinally settable to control setting of said first and second decimal point indicating means, and means responsive to resetting of said adjusting means from any one of its ordinally set conditions of adjustment to any other one of its ordinally set conditions of adjustment for resetting said first and second decimal point indicating means.

18. In a calculating machine having a fixed frame including a keyboard, a denominationally shiftable carriage carrying an accumulator register and a counter register, and means for shifting said carriage; ordinally settable decimal point indicating means for said keyboard, ordinally settable decimal point indicating means for said accumulator register, ordinally settable decimal point indicating means for said counter register, adjusting means ordinally settable to control setting of said respective decimal point indicating means, and means responsive to resetting of said adjusting means from any one of its ordinally set conditions of adjustment to any other one of its ordinally set conditions of adjustment for resetting said respective decimal point indicating means.

19. The combination according to claim 18, wherein said decimal point indicating means for said accumulator register is carried by said carriage.

References Cited in the file of this patent

UNITED STATES PATENTS

| | | |
|---|---|---|
| 1,799,037 | Bley | Mar. 31, 1931 |
| 2,111,862 | Koca | Mar. 22, 1938 |
| 2,153,630 | Koca | Apr. 11, 1939 |
| 2,216,636 | Webb | Oct. 1, 1940 |
| 2,329,190 | Ellerbeck | Sept. 14, 1943 |
| 2,365,324 | Avery | Dec. 19, 1944 |
| 2,628,031 | Ellerbeck | Feb. 10, 1953 |
| 2,736,494 | Ellerbeck | Feb. 28, 1956 |
| 2,768,786 | Reppert | Oct. 30, 1956 |
| 2,922,573 | Reppert | Jan. 26, 1960 |
| 3,019,971 | Reynolds et al. | Feb. 6, 1962 |

FOREIGN PATENTS

| | | |
|---|---|---|
| 515,777 | Italy | Feb. 16, 1955 |
| 434,146 | Germany | Sept. 21, 1926 |